United States Patent Office 2,964,380
Patented Dec. 13, 1960

2,964,380

RECOVERY OF URANIUM AND VANADIUM VALUES FROM ORES

Morris Kolodney and Seymour C. Hyman, River Edge, N.J., assignors to Nuclear Development Corporation of America, a corporation of New York No Drawing. Filed Jan. 14, 1955, Ser. No. 481,976

8 Claims. (Cl. 23—14.5)

This invention relates to the recovery of metals from their ores, and provides an improved method for extracting metal values from an ore by leaching the ore with a solvent solution. The invention is particularly useful for recovering uranium and vanadium from their ores, and especially from low grade ores which are uneconomical to treat by heretofore known methods.

A major objective of the invention is to provide for leaching the ore in such manner as to concentrate the valuable mineral in a small volume of the leach solution. A further object of the invention is to provide a method of extracting valuable minerals from ores that are too lean to warrant extraction by existing methods. These objects are achieved, in accordance with the invention, by passing a solvent through a bed or column of the ore, separating the initial effluent solution which contains little or no mineral values from the subsequent pregnant portion of the effluent, and separately recovering such subsequent portion of the effluent in which the mineral values are mainly concentrated.

Prior to our invention, the usual method of leaching uranium and vanadium from ores containing them has involved flooding the ore with a solution of a solvent, and allowing the ore and solvent solution to remain in contact long enough to dissolve the mineral values from the ore. Alternatively, the ore has been agitated with a large volume of solvent solution until the mineral values have been dissolved. In both instances the mineral content of the resulting solution is low, and it has usually been necessary to employ successive leaching steps with fresh ore in order to build the uranium or vanadium content of the leach solution to a usable concentration. In order to render these processes economical, it has also been necessary to treat the mass of ore with successive washes to recover adhering mineral solution, thereby rendering the product even more dilute. Since large volumes of solvent have been required, it has been necessary to employ solvents that are not excessively consumed by the valueless gangue of the ore. The multitude of individual leaching and washing steps has required the use of many large tanks that are expensive to install and maintain.

Since the treatment of low-grade or lean ores would require a large number of leaching steps, and a correspondingly large number of tanks, in order to secure an adequate concentration of the mineral in the final leach solution effluent, it has not heretofore been economical to process such ores. Yet there are very large quantities of minerals dispersed in low concentrations in a form that is not amenable to concentration by existing methods. For example, uranium ores cannot be sold under conditions now prevailing (in 1954) unless they contain at least 0.1% $U_3O_8$, and such ores are actually uneconomical to treat if they contain less than about 0.2% $U_3O_8$. Nevertheless, by the use of our invention, we have found that we can profitably extract uranium from ores containing even less than 0.02% of the uranium oxide.

We have discovered that when a solution of a solvent is caused to flow through a body of ore in which the mineral of the valued metal is either naturally available to leaching or has been made available by crushing, an initial portion of the effluent solution is substantially barren, i.e. it contains little or none of the desired metal. Instead, the bulk of the metal value of the ore is contained in a relatively small volume of later pregnant effluent solution. Based on this discovery, the method of our invention for extracting a metal from an ore containing a mineral of such metal comprises passing a solution of a solvent for the mineral through a bed of the ore, separating the initial substantially barren portion of the effluent solution flowing from said bed of ore from the subsequent pregnant portion of the effluent, and separately collecting such pregnant portion in which the dissolved mineral value is mainly concentrated. The pregnant effluent is then treated in any desired manner for the recovery of its dissolved metal content.

The method of our invention is described below with particular reference to the recovery of uranium and vanadium from their ores, for it is especially suited to the treatment of ores of these elements.

Preparatory to carrying out the new method, a column or bed of the ore is suitably prepared for passage through it of the leach solution. Such column may be prepared by introducing the crushed ore into a leaching vessel, advantageously one which provides a long path of travel for the leach solution from one end of the column to the other. Alternatively, in favorable environments, the ore column can be prepared without actually mining it from the deposit, by providing for introduction of leach solution into the deposit and withdrawal of the solution from the deposit after it has passed through the ore body. In either case, a solution of solvent for the uranium or vanadium content of the ore is then caused to percolate through the ore column. The initial portion of the effluent leach solution flowing from the ore column is low in dissolved mineral values. As the leach solution continues to flow from the ore column, it is observed that the valued mineral concentration therein begins to increase substantially. When such concentration attains a desirably high value, the subsequent effluent leach solution is separately collected from the initial portion, and is then subjected to any desired treatment for the recovery of the metal values it contains.

In general it is desirable for the uranium or vanadium content of the leach solution to be on the average at least 0.1% by weight, in order to facilitate treatment of the leach solution by conventional procedures. Accordingly, we generally use this average concentration value to determine the point at which to begin collection of the desired pregnant leach solution separately from the relatively barren initial effluent. That is to say, we collect as one portion all leach solution which, as it flows from the ore column, contains a negligible amount of the desired metals, and we separately collect, for further treatment, the subsequent portion of solution which as it flows from the ore column is found to contain an average of 0.1% or more of the desired metals. It has been our observation that much of the initial effluent contains substantially no uranium or vanadium, and the increase in concentration of these metals in the leach solution from substantially zero to an average value of 0.1% or more takes place quite rapidly with the outflow of only a rather small volume of the solution. Consequently the content of uranium or vanadium in the initial effluent is small and represents only a negligibly small percentage of the metal values in the ore.

We offer the following theory to account for the phenomenon on which our method is based but it is understood that the theory is offered to facilitate understanding of the process, and is not intended to limit or restrict the method of our invention, which operates successfully regardless of the explanation: We believe that the initial portion of the solvent dissolves some of the uranium or vanadium mineral as it progresses through the column of ore. Simultaneously the solvent is being consumed, mainly by impurities in the ore. Eventually the initial advancing portion of the solvent solution is depleted to such an extent in active solvent that the dissolved mineral is reprecipitated. As solvent flow continues, the precipitated mineral, which may now be in more readily soluble form, is redissolved by succeeding portions of undepleted solvent, and is reprecipitated further along the ore column. As a result of this process of alternate dissolutions and precipitations, the mineral is carried in ever increasing concentration to the exit end of the ore column and is finally dissolved by a small volume of undepleted solvent. It is evident that this is not a process of simple leaching, but a combined leaching and concentration method.

In order to economize on the amount of solvent employed, it is possible to limit the amount of full-strength solvent introduced into the ore column to the amount which is indicated as sufficient to dissolve and carry from the ore the amount of metal values contained therein. Then, to cause such limited quantity of full-strength solvent to flow through the ore, a "pusher" or "flusher" of reduced-strength solvent or even plain water may be introduced, to push the full-strength solvent ahead of it through and out from the ore column. The use of low-strength "flusher" solvent rather than pure water may in some instances have the advantage of allowing the full-strength solvent to be used only to prepare an effluent containing a maximum concentration of the metal values, the low-strength "flusher" solvent being relied on to collect in a relatively dilute effluent the residue of metal values left behind by the limited volume of full-strength solvent. In such case, for maximum economy in the use of solvent, the low-strength solvent may be followed by a final "pusher" of plain water. The use of plain water as a final "pusher" or "flusher" is also desirable in leaching ores in situ, when it is expected to leave the final volume of such "pusher" unrecovered in the exhausted ore deposit.

In accordance with our invention, a considerable part of the leach solution can be collected in the initial substantially barren portion which flows from the ore column, and the subsequent pregnant portion, which carries the bulk of the uranium and vanadium content of the ore, will contain it in a concentration averaging substantially greater than the ore itself. Under these conditions, a very high proportion of the mineral values of the ore can be extracted, even from very low-grade ores containing, say, as little as 0.02% of uranium or vanadium oxides; and the extracted metal values are recovered in a leach solution containing them in a concentration high enough to be treated economically by conventional procedures (e.g. by direct precipitation of uranium from the leach solution in the form of sodium diuranate).

The method of the invention can be used equally well with acid and alkaline leach solutions. For example, when the gangue constituents of the ore are siliceous and contain little in the way of acid-soluble impurities, the uranium and vanadium minerals can most advantageously be extracted by leaching with an aqueous solution of a mineral acid, for example, sulfuric acid. When, however, the ore contains a large proportion of acid-consuming minerals, such as when the gangue is composed largely of lime rock, the uranium and vanadium minerals are best extracted with an alkaline leach solution such as an aqueous solution of a sodium carbonate (either the normal carbonate or the bicarbonate).

While strong and hot leach solutions can be used in carrying out the method of the invention, it is often preferable to employ cold dilute solutions. For example, in many operations it is preferable to percolate the leach solution slowly through the column of ore, so that the time of contact between leach solution and the ore is fairly long (it may range from a period of several hours or even a day or so in leaching small ore columns in a leaching plant, to a matter of many days in leaching a large underground column of ore in place). With long periods of contact, the solution is preferably used at or about room or ground temperature, and the solvent concentration is kept rather low. Generally speaking, with both acid and alkaline leach solutions, the concentration of active solvent need not exceed 5% by weight, and it may with advantage be about 3% by weight or even somewhat less.

Our method is admirably suited to the extraction of minerals from earth formations in which they occur without mining or crushing the ore. In many instances, minerals have been deposited by ground waters in permeable sedimentary formations, and these minerals are thus directly available to leaching by a solvent flowing through the permeable strata. For example, many of the uranium deposits of the Colorado Plateau are of this character, and many contain too little uranium to warrant extraction by conventional mining methods. These presently uneconomical deposits can be profitably exploited by our method, using techniques that have been developed in the secondary recovery of oil by water flooding. We drill holes at distances of several hundred feet in conventional 5-spot or 7-spot patterns, thus creating natural columns of ore. We introduce the solvent solution into appropriate drill holes and remove it from others enriched in uranium.

The following examples will serve to elucidate our method further, but it is understood that our invention is not limited to these examples either in respect to kind of solvent or types of ore.

*Example 1*

Approximately 5180 grams of a crushed autunite type uranium ore containing 0.052% available uranium was made into a column one inch in diameter and twenty feet long. The ore was leached by causing one liter of 3% aqueous sodium carbonate to percolate through it. The initial 300 cc. of effluent solution contained substantially no uranium, and the next 50 cc. contained less than 0.1% uranium. This portion of 350 cc. was set aside. The succeeding 650 cc., which was separately collected, contained in exces of 0.1% uranium, the maximum concentration being 0.46%. Approximately 500 cc. of the 650 carried in excess of 0.2% uranium. Approximately 80% of the available uranium present in the ore was thus recovered in a concentration suitable for direct precipitation by sodium hydroxide.

*Example 2*

Approximately 900 grams of a crushed uranium ore containing 0.045% available uranium was made into a column four feet long and one inch in diameter. A 3% aqueous solution of sodium carbonate was caused to percolate through this column. The first 68 cc. portion of effluent carried less than 0.1% uranium. The next 95 cc., which was collected separately from the first portion, contained in excess of 0.1% uranium, the maximum concentration being 0.39%. Approximately 55 cc. of this separately collected effluent contained over 0.2% uranium. Despite the very short column, 72% of the available uranium content of the ore was recovered in the second portion of the leach solution, and in a concentration suited to direct precipitation by sodium hydroxide.

Example 3

A carnotite ore containing 0.08% uranium, in the amount of 2070 grams, was placed in a column one inch in diameter and approximately eight feet long. A little over 800 cc. of a 3% aqueous solution of sulfuric acid was caused to pass through the column. The first 200 cc. of effluent carried substantially no uranium, and the following 60 cc. contained less than 0.1% uranium. This 260 cc. was collected as the initial substantially barren effluent. The next 550 cc. was separately collected as the pregnant effluent. All of this pregnant portion contained more than 0.1% uranium, and 500 cc. of it carried, as it emerged from the ore, more than 0.16% uranium. The peak uranium concentration of this collected pregnant effluent was 0.48% as it flowed from the ore column. Approximately 82% of the uranium present in the ore was extracted in the pregnant effluent at a concentration suitable for immediate recovery as sodium diuranate.

Example 4

An ore column one inch in diameter and approximately four feet long containing 970 grams of a carnotite ore assaying 0.080% available uranium was prepared. Upon causing a little over 250 cc. of a 3% sulfuric acid solution to flow through this column, it was found that the first 50 cc. contained substantially no uranium, the next 40 cc. contained less than 0.1% uranium, and the following 165 cc. contained more than 0.1% uranium. The peak uranium concentration of the latter effluent was about 0.23%. Approximately 41% of the available uranium was extracted and separately collected in a form suitable for immediate precipitation as sodium diuranate. The relatively low peak uranium concentration in the later effluent, and the relatively low over-all recovery of uranium, was to a large extent due to the shortness of the ore column and the low total volume of leach solution. However, it will be noted that even under these adverse conditions there was a marked concentration of uranium in the final effluent.

We claim:

1. The method of recovering at least one of the elements uranium and vanadium from an ore containing a mineral thereof which comprises preparing a column of said ore, percolating through the ore column a solution of a solvent for said mineral, said solvent solution as introduced into contact with the ore being substantially free of both dissolved uranium and dissolved vanadium, separating the intial substantially barren portion of the effluent solution flowing from the ore column from the subsequent pregnant portion of the effluent, separately collecting such pregnant portion in which the dissolved metal value of the ore is mainly concentrated, treating such pregnant effluent after a single pass thereof through the ore column for the recovery of its dissolved metal content, and disposing of the initial barren portion of the effluent without subjecting it to such treatment.

2. The method of extracting at least one of the elements uranium and vanadium from an ore containing a mineral thereof, which comprises passing a solution of a solvent for such mineral through a bed of the ore, said solvent solution as introduced into contact with the ore being substantially free of both dissolved uranium and dissolved vanadium, separating the initial substantially barren portion of the effluent solution flowing from said bed of ore from the subsequent pregnant portion of the effluent, separately collecting such pregnant portion in which the dissolved mineral value is mainly concentrated, treating said pregnant portion as collected after a single pass thereof for the recovery of its dissolved mineral values, and disposing of the initial substantially barren portion of the effluent without subjecting it to such treatment.

3. The method of recovering and concentrating at least one of the elements uranium and vanadium from an ore containing a mineral thereof, which comprises preparing a column of said ore, percolating through said column a solution of a solvent for said mineral, said solvent solution as introduced into contact with the ore being substantially free of both dissolved uranium and dissolved vanadium, collecting an initial substantially barren portion of the effluent solution flowing from the ore column, which portion contains the dissolved element in too low concentration for treatment to recover it, separately collecting a subsequent portion of the effluent solution which contains the dissolved element in greater concentration than the original ore, treating said subsequent portion of the effluent solution as collected after a single pass through the ore for the recovery of the dissolved mineral value therein, and disposing of the initial portion of the effluent solution without subjecting it to such treatment.

4. The method of recovering at least one of the elements uranium and vanadium from an ore containing an acid-soluble mineral thereof, which comprises percolating a dilute aqueous sulfuric acid solution through a bed of said ore, said solution as introduced into contact with the bed of ore being substantially free of both dissolved uranium and dissolved vanadium, collecting an initial portion of the effluent solution flowing from said bed of ore, which portion is substantially devoid of dissolved mineral values, separately collecting a subsequent portion of the effluent solution in which the dissolved mineral value is mainly concentrated, treating said subsequent portion of the effluent solution as collected after a single pass through the ore for the recovery of the dissolved mineral value therein, and disposing of the initial portion of the effluent solution without subjecting it to such treatment.

5. The method of recovering at least one of the elements uranium and vanadium from an ore containing a carbonate-soluble mineral thereof, which comprises percolating a dilute aqueous solution of a sodium carbonate through a bed of said ore, said solution as introduced into contact with the bed of ore being substantially free of both dissolved uranium and dissolved vanadium, collecting an initial portion of the effluent solution flowing from said bed of ore, which portion is substantially devoid of dissolved mineral values, separately collecting a subsequent portion of the effluent solution in which the dissolved mineral value is mainly concentrated, treating said subsequent portion of the effluent solution as collected after a single pass through the ore for the recovery of the dissolved mineral value therein, and disposing of the initial portion of the effluent solution without subjecting it to such treatment.

6. The method of recovering uranium from a low-grade uranium ore containing less than 0.1% by weight of uranium which comprises percolating a solution of a solvent for the uranium content of the ore through a bed of the ore, said solvent as introduced into contact with the ore being substantially free of dissolved uranium, withdrawing the initial portion of the effluent solution which as it flows from the ore contains a negligible amount of dissolved uranium, separately recovering the subsequent portion of effluent solution which as it flows from the ore contains an average of at least 0.1% by weight of dissolved uranium, treating said subsequent portion of the effluent solution as it flows from the ore after a single pass in contact therewith for the recovery of uranium, and disposing of the initial portion of the effluent solution without subjecting it to such treatment.

7. The method of recovering uranium from a low-grade uranium ore which comprises preparing a column of said ore, percolating through said column an aqueous solution containing less than 5% by weight of a uranium solvent of the group consisting of sulfuric acid and sodium carbonate, said solvent as introduced into contact with the ore being substantially free of dissolved uranium, withdrawing the initial portion of effluent solution flowing from the ore column in which the uranium concentration is negligible, separately collecting the subsequent portion of the effluent solution in which the uranium is mainly concentrated, treating said subsequent portion of the effluent solution as it flows from the ore after a single pass in contact therewith for the recovery of uranium, and disposing of the initial portion of the effluent solution without subjecting it to such treatment.

8. The method of recovering at least one of the elements uranium and vanadium from an ore containing a mineral thereof which comprises preparing a column of said ore, percolating through the ore column a solution of a solvent for said mineral, said solvent solution as introduced into contact with the ore being substantially free of both dissolved uranium and dissolved vanadium, the volume of such solvent solution being sufficient to extract the valued mineral from the ore but being insufficient to provide the volume of liquid which must be left unrecovered in the ore column, separating the initial substantially barren portion of the effluent solution flowing from said bed of ore from the subsequent pregnant portion of the effluent, separately collecting such pregnant portion in which the dissolved mineral value is mainly concentrated, flushing substantially all of said pregnant portion from the ore column by passing therethrough a flushing liquid in amount sufficient to displace the pregnant solvent solution from the ore, treating said pregnant portion as collected after a single pass thereof for the recovery of its dissolved mineral values, and disposing of the initial substantially barren portion of the effluent without subjecting it to such treatment.

References Cited in the file of this patent

UNITED STATES PATENTS

| | | |
|---|---|---|
| 1,068,730 | Bleeker | July 29, 1913 |
| 1,129,029 | Vogt | Feb. 16, 1915 |
| 2,640,754 | Lundquist | June 2, 1953 |
| 2,654,653 | Nye et al. | Oct. 6, 1953 |
| 2,818,240 | Livingston | Dec. 31, 1957 |
| 2,896,930 | Menke | July 28, 1959 |

OTHER REFERENCES

Strain: "Chromatographic Absorption Analyses," vol. II, Interscience Publishers, Inc., N.Y.C., revised reprint 1945, pp. 9, 13, 45, 46, 77–81. (Copy in Scientific Library.)